United States Patent [19]
Hekman

[11] Patent Number: 5,161,924
[45] Date of Patent: Nov. 10, 1992

[54] METHOD AND TOOL FOR CONCENTRIC BACKCHAMFERING ON A TURNING MACHINE

[75] Inventor: Edward W. Hekman, Holland, Mich.

[73] Assignee: Autocam Corporation, Kentwood, Mich.

[21] Appl. No.: 738,884

[22] Filed: Aug. 1, 1991

Related U.S. Application Data

[63] Continuation-in-part of Ser. No. 400,991, Aug. 31, 1989, abandoned.

[51] Int. Cl.⁵ ............................................. B23B 51/10
[52] U.S. Cl. .................................... 408/229; 408/226; 408/127; 408/714; 408/1 R; 82/1.11
[58] Field of Search ............................ 408/227–229, 408/1 A, 127, 226, 223, 214, 238; 279/16; 29/27 C; 82/151, 171, 1.11, 113; 407/8–10

[56] References Cited

U.S. PATENT DOCUMENTS

| | | | |
|---|---|---|---|
| 252,704 | 1/1892 | Southwick | 408/223 X |
| 1,249,240 | 12/1917 | Summers | 10/140 X |
| 2,389,909 | 11/1945 | Hofbaver | 408/223 X |
| 2,795,979 | 6/1957 | Zerwick . | |
| 3,174,168 | 3/1965 | Jones | 408/238 X |
| 3,346,894 | 10/1967 | Lemelson | 10/140 X |
| 3,564,948 | 2/1971 | Pomernaki | 408/226 |
| 4,014,622 | 3/1977 | Lotz | 279/16 X |
| 4,093,395 | 6/1978 | Luebbert et al. | 408/226 X |
| 4,180,894 | 1/1980 | Link | 29/27 C X |
| 4,343,577 | 8/1992 | Purdon | 408/714 X |

FOREIGN PATENT DOCUMENTS

| | | | |
|---|---|---|---|
| 54992 | 7/1938 | Denmark | 408/127 |
| 203260 | 10/1983 | Fed. Rep. of Germany | 408/226 |
| 2219229 | 6/1989 | United Kingdom | 408/226 |

Primary Examiner—Larry I. Schwartz
Assistant Examiner—Robert Schultz
Attorney, Agent, or Firm—Price, Heneveld, Cooper, DeWitt & Litton

[57] ABSTRACT

A chamfering tool and method for use in the precision backchamfering of a rotating part. The chamfering tool has a cutting head portion selected to match the size of the surface to be chamfered. Behind the cutting head is a shank portion of reduced diameter which connects the cutting head portion to an enlarged portion which supports the chamfering tool in a fixed tool holder. If the part centerline is not aligned with the rotating collet centerline, the part center traces a circular orbit. The shank portion of reduced diameter enables the tool to flex so that the cutting head can follow the part centerline being guided by the part's inner diameter.

8 Claims, 1 Drawing Sheet

METHOD AND TOOL FOR CONCENTRIC BACKCHAMFERING ON A TURNING MACHINE

CROSS REFERENCE TO RELATED APPLICATION

This application is a continuation-in-part of prior pending application Ser. No. 07/400,991, filed Aug. 31, 1989, by Edward W. Hekman, entitled METHOD AND TOOL FOR CONCENTRIC BACKCHAMFERING ON A TURNING MACHINE and now abandoned.

BACKGROUND OF THE INVENTION

Counterbores and chamfering tools are well-known for frequently causing problems when used in machining parts held in a rotating chuck. If the counterbore or chamfering tool is held, for example, in the tail stock of a lathe and the part to be shaped is in the head stock, it is not uncommon for the centerline of the part to not precisely align with the centerline of the collet holding the part. When this happens, the chamfering tool will tend to shape only one portion of the aperture in the part to be shaped leaving the remainder intact. The tool can also provide an egg-shaped chamfer depending on the degree that the centerline of the part is off the centerline of the collet holding the part. In the precision machining or chamfering of small parts, it is extremely difficult to properly align the chamfering tool with the aperture in the part which is to be shaped.

SUMMARY OF THE INVENTION

In accordance with the present invention, an improved method and chamfering tool is provided for use in the precision machining of small parts. The chamfering tool has a cutting head portion and a tool mounting portion spaced from each other by a shank portion of reduced diameter. The reduced diameter shank portion joins the cutting head and tool mounting portion into a single entity. The shank portion of reduced diameter enables the tool to flex so that the cutting head can follow the part's centerline being guided by the part's inner diameter. The method of using the improved chamfering tool in the precision machining of small parts is also disclosed.

DETAILED DESCRIPTION

Figure 1:
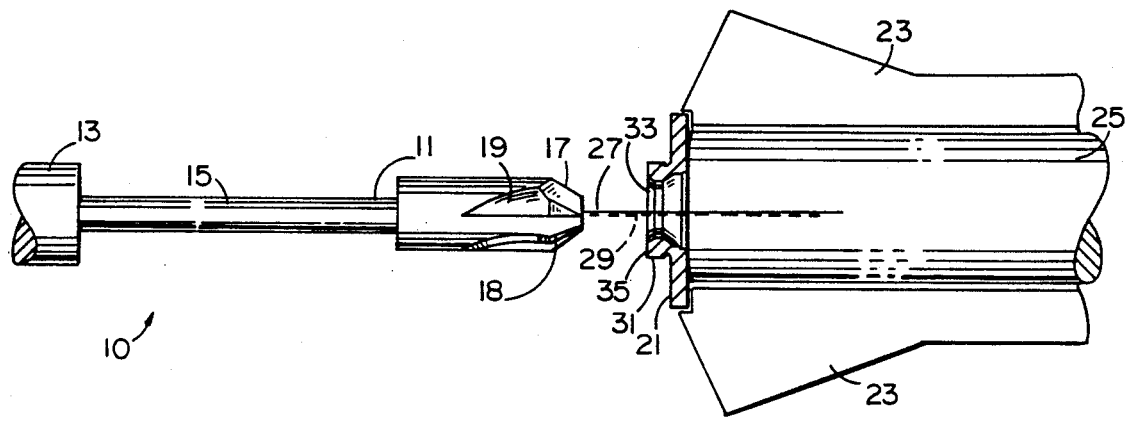
FIG. 1 is an enlarged, diagrammatic view showing the chamfering tool aligned with a part which is supported in a collet.

Referring to FIG. 1, the chamfering tool indicated generally by the number 10, has a cutting head portion 11 and a portion 13 which is shown cutoff, as the remainder would merely be an extension of the enlarged cylindrical shape, joined together by a reduced portion 15. The cutting head portion 11 has a plurality of substantially identical cutting faces 17 positioned about the centerline of the tool. Flutes 19 are provided adjacent to the cutting edges 17 so that chips and debris will be cleared from the cutting head, preventing the head from becoming jammed in the part being machined. A part to be backchamfered 21 is shown supported in the identical jaws 23 of a collet which supports the piece against a backup shaft 25. It can be seen in FIG. 1 that the centerline 27 of the part 21 does not align with the centerline 29 of the collet. When the centerline of the part is not aligned with the centerline of the collet, the part's center will trace a circular orbit rather than rotate on its centerline.

Figure 2:
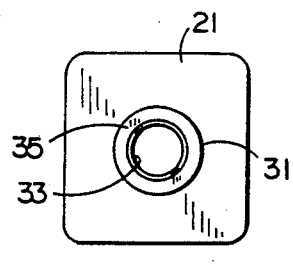
FIG. 2 is a top plan view of the part of FIG. 1.
Figure 3:
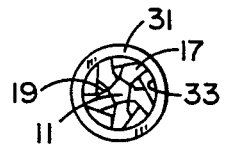
FIG. 3 is an axial view through the aperture in the part of FIG. 2 showing the cutting face in line with the aperture in the part.

The part 21 to be backchamfered is shown in FIG. 2. The part has a raised portion 31 having an aperture 33 therein. The facing edge portion 35 is to be backchamfered to provide a smooth shaped surface. In FIG. 3 only an axial view of the raised portion 31 is shown with the cutting head 11 facing the aperture 33 and with the cutting faces 17 and flutes 19 in position to cut away metal from the raised portion 31 of the part 21.

When the centerline of the part does not align with the centerline of the collet supporting the part, it is difficult to machine a precisely circular chamfered surface. In order to overcome the alignment difficulty and to improve the backchamfering of parts, the chamfering tool of the present invention employs a flexible shank portion 15 which enables the head portion 11 of the tool to float. The flexibility of the shank of the backchamfering tool allows the cutting head to follow the part centerline and cut an even backchamfer. The cutting head guides along the inner diameter of the aperture in the part being machined.

It is very important in the design of the chamfering tool 10 that the portion 15 be of a proper length and diameter. If the portion 15 is too long or too thin, it will be too flexible and the cutting head portion 11 will move erratically in the aperture 33 in the part being machined. On the other hand, if the portion 15 is too short or if its diameter is too large, then the tool will be too rigid and will tend to chatter as it strikes the out of aligned face of the part being machined. The amount of metal to be removed from the part is the primary determinant for the thickness and length of the reduced portion of the shank of the tool. If a large amount of metal is to be removed, the shank is made thicker and shorter. If only a small amount of metal is to be removed, the shank can be made thinner and longer so the cutting head will float more lightly against the part being machined. The precise dimensions of the tool can easily be determined without undue experimentation. The following are representative dimensions found to be preferred for a particular tool. Other dimensions can also provide an acceptable tool and are all considered to be within the scope of the present invention. The tool shown in FIG. 1 has an overall length of 31.75 mm. The cutting head 11 is 6.3 mm in length and 2.54±0.02 mm in diameter. The shank portion 15 is 12.75 mm in length and 1.01±0.02 mm in diameter. The portion 13 is 12.7 mm in length and 3.96±0.02 mm in diameter.

It can be seen from the above dimensions that the elongated connecting portion enables the tool to flex more than it normally would. In order to obtain this flexing, the diameter of the tool behind the cutting head is reduced. This reduces the second moment or the moment of inertia of the cross sectional area of the too. The deflection of the tool is a function of the cutting side load and the moment of inertia of the cross section. By reducing the moment of inertia, the deflection increases under the same cutting side load.

The deflection of a tool due to a cutting side load is:

$$\text{Deflection (max)} = \frac{F \times L^3}{3 \times E \times I}$$

F=Side force due to cutting side load.
L=Exposed length of the tool.
E=Modulus of elasticity for the material the tool is made of.
I=Cross-sectional moment of inertia of the tool.

Changing any of these variables can affect the deflection. The object of this technique is to reduce the moment of inertia (I) by reducing the diameter of the tool behind the cutting head.

The moment of inertia of a circular cross section is:

$$I = (\tfrac{1}{4}) \times \pi \times r^4$$

where "r" is the radius of the cross section.

Since I is a function of radius to the fourth power, changing the radius while holding all else constant will have a great effect on the deflection of the tool (reducing the radius by one-half increases the deflection by a factor of 16). It can be determined from an examination of FIG. 1 and the dimensions given above for a representative tool that the preferred range of diameter for the elongated connecting portion 15 is in the approximate range of 40% to 50% of the diameter of the cutting head portion. The diameter of the elongated connecting portion 15 is most effective when it is approximately one-half the diameter of the cutting head portion. As pointed out above, the dimensions are primarily determined by the amount of metal to be removed.

In shaping the cutting faces 17, it has been found that a land area 18 should preferably be provided on each cutting edge to provide burr free backchamfering. Each land area is approximately 0.05 mm to 0.076 mm in width. The land area should also preferably be relieved up to approximately ½ to reduce contact of the land area with the part being machined. The width of the land area and the amount of relief can vary with the amount of metal being removed from the part.

The improved chamfering tool is preferably made from cobalt tool steel similar to that used in the manufacture and treating processes are essentially the same as those used to make twist drills. Carbide steels have been found to be too brittle to use in the manufacture of the chamfering tool.

In using the tool for the present invention to backchamfer a part, the tool would be mounted in the tail stock of a lathe. The tool would then be held rigidly in place with the part to be machined being held in a collet in the rotating chuck of the lathe. The tail stock can then be either manually or automatically advanced toward the collet to bring the chamfering tool into contact with the part to be machined. As in any chamfering or counterboring operation, lubrication should be provided and the rate of advance of the tool should be controlled so that it does not unnecessarily cut too deeply into the part, causing too much of the cutting face of the tool to be in contact with the part at any one time. It is better to ease the parts together, allowing small portions of the metal to be removed and flushed out through the flutes in the cutting head by the lubricating oil. When the tail stock and, in turn, the cutting tool have advanced sufficiently, they can be withdrawn to allow removal the part from the collet. It has been found through the use of the tool of the present invention that the precise backchamfering of small precision parts can be carried out without the aforementioned difficulties.

Though the invention has been described with respect to specific preferred embodiments thereof, many variations and modifications will become apparent to those skilled in the art. It is therefore the intention that the appended claims be interpreted as broadly as possible in view of the prior art and to include all such variations and modifications.

The embodiments of the invention in which an exclusive property or privilege is claimed are defined as follows:

1. A single piece chamfering tool comprising:
    an integral cutting head portion having a tapered leading end defining a positive point angle and having a plurality of cutting faces positioned about the centerline of said tool, each of said cutting faces being separated by a flute portion;
    an integral tool mounting portion spaced from said cutting head portion; and
    an integral elongated connecting portion of reduced diameter joining said cutting head and said tool mounting portions so that said connecting portion is deflectable laterally of the longitudinal axis of the tool, said connecting portion being at least twice the length of said head portion and having a diameter the length thereof approximately 40 to 50% of the diameter of said cutting head portion.

2. A chamfering tool as set forth in claim 1 wherein the interfaces between the connecting portion and the mounting portion and head portion are stepped.

3. A chamfering tool as set forth in claim 1 wherein said cutting head has 5 flute portions.

4. A chamfering tool as set forth in claim 1 wherein a land area is provided on each cutting face.

5. A chamfering tool as set forth in claim 4 wherein the land area on each cutting face is relieved to reduce contact with the part being machined.

6. A chamfering tool for the precision machining of an edge portion of a workpiece while supported in a rotatable workpiece holder with the center of rotation of the workpiece not in alignment with the center of rotation of said workpiece holder comprising a single piece tool having a cutting head portion having a tapered leading end defining a positive point angle and joined by a shaft portion to an enlarged tool holding portion, the diameter of said shaft portion the length thereof being reduced from that of said mounting portion and being approximately 40% to 50% of the diameter of said cutting head portion and have a length at least twice as long as that of said head portion said shaft portion enabling said cutting head portion to deflect as the head portion engages the edge of said workpiece to be machined as the workpiece rotates out of alignment with the center of rotation of said workpiece holder.

7. A chamfering tool for precision machining as set forth in claim 6, wherein said shaft portion has a diameter approximately one-half the diameter of said cutting head portion.

8. A tool for precision machining as set forth in claim 7, wherein said cutting head portion has a plurality of cutting edges, each of said cutting edges having an adjacent land area, each of said land areas being relieved up to one-half degree to reduce the amount of contact between said land areas and the part being machined.

* * * * *

UNITED STATES PATENT AND TRADEMARK OFFICE
CERTIFICATE OF CORRECTION

PATENT NO. : 5,161,924
DATED : November 10, 1992
INVENTOR(S) : Edward W. Hekman It is certified that error appears in the above-identified patent and that said Letters Patent is hereby corrected as shown below:

column 2, line 62:
"too" should be --tool--;

column 3, line 38:
after "1/2" insert --°--;

column 3, line 66:
after "removal" insert --of--;

column 4, claim 8, line 62:
"claim 7" should be --claim 6--.

Signed and Sealed this

Fifteenth Day of March, 1994

*Attest:*

BRUCE LEHMAN

*Attesting Officer*     *Commissioner of Patents and Trademarks*